(12) United States Patent
Crowley et al.

(10) Patent No.: US 12,345,157 B2
(45) Date of Patent: Jul. 1, 2025

(54) PISTON AND CYLINDER ASSEMBLY OF A DOWNHOLE TOOL, DOWNHOLE TOOL WITH A PISTON AND CYLINDER ASSEMBLY, AND METHOD OF ASSEMBLING THE PISTON AND CYLINDER

(71) Applicant: ROCKATEK LIMITED, Gloucester (GB)

(72) Inventors: Daniel Brendan Crowley, Gloucester (GB); Robert Donald John Sedgeman, Gloucester (GB)

(73) Assignee: ROCKATEK LIMITED, Gloucester (GB)

( * ) Notice: Subject to any disclaimer, the term of this patent is extended or adjusted under 35 U.S.C. 154(b) by 0 days.

(21) Appl. No.: 18/564,762

(22) PCT Filed: May 24, 2022

(86) PCT No.: PCT/IB2022/054842
§ 371 (c)(1),
(2) Date: Nov. 28, 2023

(87) PCT Pub. No.: WO2022/249055
PCT Pub. Date: Dec. 1, 2022

(65) Prior Publication Data
US 2024/0376783 A1 Nov. 14, 2024

(30) Foreign Application Priority Data
May 28, 2021 (GB) ..................................... 2107643

(51) Int. Cl.
*E21B 7/06* (2006.01)
*E21B 17/10* (2006.01)

(52) U.S. Cl.
CPC ............ *E21B 7/06* (2013.01); *E21B 17/1014* (2013.01)

(58) Field of Classification Search
CPC ... E21B 7/04; E21B 7/06; E21B 7/062; E21B 17/1014
See application file for complete search history.

(56) References Cited

U.S. PATENT DOCUMENTS 6,257,356 B1 * 7/2001 Wassell ..................... E21B 7/06
175/73
7,044,240 B2   5/2006 McNeilly
(Continued)

FOREIGN PATENT DOCUMENTS

| EP | 0530045 A1 | 3/1993 |
| EP | 1024245 A2 | 8/2000 |

(Continued)

*Primary Examiner* — Brad Harcourt
(74) *Attorney, Agent, or Firm* — ARC IP Law, PC; Joseph J. Mayo (57) ABSTRACT

A piston and cylinder assembly of a downhole tool including a rotary steerable tool. The piston has an outer wall in direct sliding contact with a wall of the cylinder. The cylinder has a retainer for the piston, the retainer has a retaining part and the piston has a retained part, such that the retaining part and the retained part cooperate to retain the piston in the cylinder. The invention separates the function of retaining the piston from sealing the piston to cylinder interface. The invention also relates to a method of assembling the piston and cylinder including rotating the piston relative to the cylinder so that at least a portion of the retained part becomes aligned with at least a portion of the retaining part, and locking the piston against subsequent rotation relative to the cylinder.

33 Claims, 7 Drawing Sheets

(56) References Cited

U.S. PATENT DOCUMENTS

| | | |
|---|---|---|
| 7,377,337 B2 | 5/2008 | Swietlik et al. |
| 7,654,344 B2 | 2/2010 | Haughom et al. |
| 7,878,272 B2 * | 2/2011 | Eppink ............... E21B 17/1014 175/325.1 |
| 9,624,727 B1 | 4/2017 | Hutton |
| 10,253,584 B2 | 4/2019 | Crowley et al. |
| 2004/0238219 A1 | 12/2004 | Nichols et al. |
| 2009/0223717 A1 | 9/2009 | Eppink |
| 2010/0025116 A1 * | 2/2010 | Hutton .................... E21B 21/10 175/76 |
| 2012/0061148 A1 * | 3/2012 | Clausen ................... E21B 7/06 175/267 |
| 2013/0118812 A1 | 5/2013 | Clausen et al. |
| 2017/0030149 A1 | 2/2017 | Kadam et al. |
| 2019/0284882 A1 | 9/2019 | Peters et al. |

FOREIGN PATENT DOCUMENTS

| | | |
|---|---|---|
| WO | 2004090278 A1 | 10/2004 |
| WO | 2016/130865 A1 | 8/2016 |
| WO | 2019232006 A1 | 12/2019 |

* cited by examiner

PISTON AND CYLINDER ASSEMBLY OF A DOWNHOLE TOOL, DOWNHOLE TOOL WITH A PISTON AND CYLINDER ASSEMBLY, AND METHOD OF ASSEMBLING THE PISTON AND CYLINDER

FIELD OF THE INVENTION

The invention relates to a piston and cylinder assembly of a downhole tool, and in particular a piston and cylinder assembly of a downhole tool as part of an assembly used to drill a borehole into the earth. The borehole may be drilled, for example, to exploit geothermal energy or for the exploration and extraction of underground oil and gas reserves.

The invention is expected to have its greatest utility as part of a downhole assembly incorporating a steering tool by which the drill bit can be steered in a chosen direction, and in particular a rotary steerable tool. In such applications the downhole tool rotates during use and the piston is actuated as the tool rotates. For brevity most of the following description relates to a piston and cylinder assembly of a rotary steerable tool (which can be connected to the drill bit or integrated into the drill bit) but the invention is nevertheless also applicable to other rotating downhole tools, and also to downhole tools which do not rotate (or at least which do not rotate when the piston is actuated).

The invention also relates to a downhole tool with a piston and cylinder assembly, and to a method of assembling the piston and cylinder.

For ease of reference, directional and orientational terms such as "top", "bottom" etc. in this specification refer to a piston which is movable in a substantially vertical direction with the exposed piston surface uppermost. It will be understood, however, that the piston will usually be oriented at many different angles during use.

BACKGROUND TO THE INVENTION

When drilling a borehole, the drill bit is connected to surface equipment by way of a drill string. The drill string is hollow whereby drilling fluid or mud can be pumped down the borehole. The drilling fluid lubricates the drill bit and carries drill cuttings back to the surface. The drilling fluid and entrained drill cuttings return to the surface along the outside of the drill string, the drill string being smaller than the diameter of the borehole.

In some drilling applications the drill string is rotated at the surface, with the rotation being communicated to the drill bit by the drill string. In other drilling applications a downhole motor such as a mud motor is provided, which uses the flowing drilling fluid to drive the drill bit to rotate. A downhole motor may be used with a rotating, or a non-rotating, drill string.

Some downhole motors include a bent housing and are used to steer the drill bit. Downhole motors are, however, relatively crude and are largely being replaced by rotary steerable tools such as that described in EP 1 024 245. As above indicated, the drill string is smaller than the diameter of the borehole and is typically centralised in the borehole. The rotary steerable tool is located close to the drill bit (or in some cases integrated into the drill bit) and has radial pistons which can be extended to force the drill string away from the centre of the borehole, and thereby force the drill bit to deviate from a linear path. Rotary steerable tools can be used with rotating drill strings which permit the drilling of much deeper boreholes than non-rotating drill strings. Rotation of the drill string typically requires the pistons to be actuated sequentially and cyclically to match the rotation of the drill string.

In some rotary steerable tools the pistons engage the borehole directly, whilst in other rotary steerable tools the pistons engage a sleeve or other componentry which engages the borehole. In "push the bit" arrangements the rotary steerable tool directly pushes the drill bit sideways in the borehole. In "point the bit" arrangements a stabiliser or other component is located between the rotary steerable tool and the drill bit and acts as a fulcrum for the force exerted by the rotary steerable tool.

In addition to rotary steerable tools, extendable pistons are also used, for example, in adjustable gauge stabilizers and logging-while-drilling (LWD) sampling tools.

A piston and cylinder assembly of a downhole tool must operate effectively and reliably in a particularly harsh environment. The piston and cylinder assembly must satisfy a number of critical requirements. One critical requirement is reliability since the cost of removing the downhole assembly to repair or replace a failed piston or cylinder is considerable. The likelihood of failure of a rotary steerable tool in particular is generally increasing as downhole drilling tools are being used to drill longer and deeper boreholes at greater rates of penetration.

The drilling fluid is typically used to actuate the pistons of downhole tools, including rotary steerable tools. Piston actuation typically relies upon the difference between the (higher) pressure of the drilling fluid inside the drill string and the (lower) pressure of the drilling fluid in the annulus outside the drill string. This difference in the pressure is a result of flow restrictions in the drill string, in the drill bit and through any additional nozzles mounted within the tools to adjust the pressure drop. In the case of a rotary steerable tool the force which the pistons exert on the borehole wall determines the curvature of the borehole; the force is significant and is proportional to the pressure differential.

The downhole tool is usually rotating at the same rate as the drill bit—typically 90-400 rpm. The tool, and the extendable pistons, are also subjected to all of the typical downhole dynamics—in particular torsional resonance. In the arrangements in which the pistons are forced directly against the borehole wall the pistons must be able to withstand abrasion and the pistons and cylinders must both be able to withstand the offset (sideways) forces caused by the surface contact, primarily during rotation.

Correct and reliable operation of the extendable pistons also requires the pistons to be effectively sealed in their respective cylinders. The sealing member or interface must be able to cope with repeated piston reciprocation whilst maintaining a seal that can withstand the pressure differential. As above stated, in most applications drilling fluid is used to actuate the pistons. Drilling fluid is an abrasive, corrosive fluid which presents considerable challenges to dynamic mechanical systems.

Sealing of the piston in its cylinder can be accomplished in different ways. One method is to use one or more elastomer seals which are designed to resist abrasion and corrosion whilst sweeping along the cylinder wall (or less commonly whilst the piston sweeps past the stationary seal). However, elastomer seals have a limited life, especially in applications in which drilling fluid is used to actuate the pistons.

Another method is to use a solid sealing system without specific sealing members, in which the sealing is accomplished by the very close-fitting interface between the piston and its cylinder. In practice the solid sealing system will leak at a slow but acceptable and predictable rate. However, the length of the path along which the fluid must leak is critical to the performance of the seal and it is desirable to maximise that path length. It is also desirable to maximise the area of sliding contact between the piston and the cylinder to minimise wear rates. It is also desirable to minimise or avoid any discontinuities in the sealing interface in order to create a consistent and stable fluid velocity profile with no localised regions of excessive leakage.

Effective sealing is of great importance for many reasons. One reason is that the flow rate of drilling fluid down the drill string is limited by the power available at the surface to pump large volumes of drilling fluid at high pressure—any fluid which leaks past the piston wastes some of the mud flow. The primary role of the drilling fluid is to lubricate the drill bit and carry drill cuttings away from the active face of the drill bit—any fluid which leaks past the piston necessarily bypasses the active bit face. A further reason is that leakage past the piston will result in some or all of the following: reduced piston force, slower piston response time, increased erosion of steering tool internals, increased wear at the piston sealing interface and increased pumping losses at the surface.

The sealing of the pistons is often the critical factor in determining the service life of a downhole tool, i.e. leakage past the pistons often limits how long a tool remains operable and how long a borehole can be drilled with a single tool.

Rotary steerable tools in particular are typically very expensive and in many such tools a large proportion of the asset costs and ongoing repair and maintenance costs are contributed by the steering componentry, most often consisting of the steering tool body, pistons and supporting parts.

Rotary steerable tools are nowadays operated in deeper and longer boreholes and in increasingly severe environments. Downhole dynamics such as high frequency torsional oscillation present considerable challenges for steering tool integrity and service life. Fatigue and material failure caused by the harsh environment are significant factors affecting the tool's reliability and are therefore major concerns for the designer and operator of downhole tools incorporating extendable pistons. Clearly, a rotary steerable tool having multiple extendable pistons requires a great deal of machining and material removal to create features to accept the pistons, to retain the pistons, and to deliver fluid to actuate the pistons. Almost without exception, any material removal compromises the tool's integrity and increases its susceptibility to fatigue damage or material failure such as cracking.

It is widely understood by engineers involved in the design and development of rotary steerable tools (and other downhole tools employing extendable pistons) that they must cater for fatigue of the tool and for the high frequency loading which the tool will experience in use, and must take steps to mitigate the stresses experienced by the downhole tool.

However, there is a finite volume of material available within a downhole tool and this limits an engineer's ability to provide a tool meeting the ideal design requirements. In particular, larger pistons will typically be able to generate a greater force upon the borehole and therefore greater borehole curvature. Also, larger ports for the actuating fluid will reduce internal pressure losses and erosion. Furthermore, a large bore through the downhole tool will maximise the flow of drilling fluid to the drill bit. All of these advantageous features require the removal of more material from the body of the downhole tool than would be the case for less beneficial features (such as smaller pistons, for example). The problems caused by additional material removal are exacerbated for downhole tools of smaller overall diameter as are desired for drilling smaller boreholes. Maximising the tool's capability (such as its steering capability) and performance is therefore typically at odds with maximising the strength and integrity of the tool.

In order to maximise the service life of a downhole tool it is typically necessary to maximise the volume of material in those areas of the tool which encounter the highest stresses during use, and also to remove or reduce any stress concentrations.

Another critical requirement of downhole tools is to maximise the cross-sectional area between the tool and the borehole wall (this area is usually referred to as the "junk slot area" or "JSA"). Whilst an annulus between the drill string and the borehole exists for the full length of the drill string, the area of the annulus is typically relatively small at the rotary steerable tool, so the rotary steerable tool effectively provides a restriction to the drilling fluid returning to the surface. This is becoming a greater concern as drilling speeds increase and as boreholes become longer. Faster drilling creates drill cuttings at a faster rate and those drill cuttings must be removed at a faster rate. Longer boreholes cause a larger pressure drop between the surface and the drill bit and for a given pressure in the drilling fluid at the surface the flow rate through the drill bit will be reduced, which in turn reduces the hole cleaning performance and increases the likelihood of the drill bit becoming stuck. Furthermore, rate of penetration (ROP) may be limited as a result of reduced cuttings transport away from the drill bit During recent times a junk slot area of 12-18% (i.e. the open area around the tool as a proportion of the total area of the borehole) was generally acceptable but operators are now commonly asking rotary steerable tool designers to provide a larger junk slot area of between 18 and 25%. It is widely acknowledged that large junk slot areas are difficult to achieve in rotary steerable systems owing to the volume of the components and the material required to create reliable working systems. However, it is a field of ongoing development because of the close proximity of the rotary steerable tool to the drill bit where cuttings are generated.

SUMMARY OF THE INVENTION

The invention relates to a piston and cylinder assembly of a downhole tool, to a downhole tool and to a method of assembly of the pistons and cylinders. The pistons in the downhole tool are necessarily independently moveable and reliably retained so as not to stick in a retracted or extended position, nor to break free from the tool.

It is in particular an object of the invention to allow the piston diameter (and therefore area) to be increased whereby to increase the force which can be applied to the borehole wall. Increasing the piston diameter has the additional benefit of increasing the piston circumference and therefore the load bearing area, and acts to minimise wear at the expense of generating a larger leak path. Consistent sealing geometry around the piston's full circumference is an important requirement to achieving this object of the invention whilst maintaining an acceptable leak rate.

It is another object of the invention to make the assembly and disassembly of the pistons and cylinders as simple as possible.

It is another object of the invention to utilise solid sealing technology (e.g. direct metal to metal and/or metal to ceramic contact) and thereby make it possible to avoid issues with the long-term reliability of, for example, elastomer seals.

It is another object of the invention to provide a piston and cylinder with an uninterrupted plain sealing interface around the periphery of the piston whereby to enhance the mechanical seal.

It is another object of the invention to seek to ensure that mechanical sealing does not build in other complications (for example avoiding the use of thin-walled sleeves which would need further retention for reliability).

In particular, it is another object of the invention to provide a tool with ample space around the piston to enable the use of a relatively thick sleeve or liner which can support the piston and withstand the loads experienced by the piston which seek to tip the piston within the cylinder as the piston is moved around the borehole wall during rotation.

It is another object of the invention to seek to avoid features which compromise fatigue life. In particular, it is an object of the invention to avoid any holes for cross pins and the like in the piston and/or in the cylinder for retaining the piston.

It is another object of the invention to avoid the need for excess material in the steering tool for large webs, lands or pads of material around the piston and cylinder to accommodate cross pins. Instead, material can be added in more highly stressed regions of the steering tool.

Avoiding the need for excess material in the steering tool for large webs, lands or pads of material around the piston(s) and cylinder(s) can also allow an increased junk slot area.

It is another object of the invention to avoid retaining the piston with components which cross the sealing interface, i.e. components which lie within the flow path for drilling fluid passing between the piston and cylinder.

According to the invention there is provided a piston and cylinder assembly of a downhole tool, the piston having an outer wall with a substantially circular periphery which is in direct sliding contact with a wall of the cylinder, the cylinder having a retainer for the piston, the retainer having at least one retaining part, the piston having at least one retained part, the retaining part and the retained part cooperating to retain the piston in the cylinder, the retained part being separate from the outer wall.

The direct sliding contact between the piston outer wall and the wall of the cylinder provides solid sealing as described above. This avoids the requirement for a separate sealing element, and avoids the disadvantages of elastomer seals or other sealing elements. Preferably the outer wall of the piston is a highly machined (e.g. ground) surface.

The retained part of the piston and the retaining part of the retainer cooperate to retain the piston in the cylinder in use whilst accommodating the required extension and retraction of the piston. Thus, the piston can move relative to the cylinder between retracted and extended positions. Preferably the retained part(s) of the piston engages the retaining part(s) of the retainer in the extended position, whereby the retained and retaining parts define the extended position of the piston and the limit of outwards movement. In other embodiments the retained part(s) of the piston do not engage the retaining part(s) of the retainer in the extended position.

Preferably the retainer is a retaining hub located (ideally substantially centrally) within the cylinder. Desirably the retaining part is aligned substantially perpendicular to the axis of the cylinder (i.e. substantially perpendicular to the direction of sliding movement of the piston).

Separating the retained part of the piston from the outer wall enables the separation of the function of retaining the piston from the function of sealing the piston. Accordingly, there is no requirement to compromise the sealing interface between the piston and cylinder with any retaining elements and the sealing interface can be complete and continuous. Also, the area of the sealing interface can be maximised for a particular piston. In particular, it is not necessary to have holes through the cylinder wall or the piston wall to accommodate retaining elements such as cross pins for example. It will be understood that any discontinuities in the sealing surfaces which are caused by holes or the like will reduce the sealing capability and increase the rate of fluid leakage between the piston and cylinder.

Preferably the cylinder includes a sleeve or liner of hard material, and in particular a sleeve of harder material than the surrounding material of the tool. Desirably the sleeve is of ceramic material, for example tungsten carbide, but liners of a hard metal and composite materials can be suitable in some applications. Tungsten carbide sleeves are known to be used as liners for cylinders in downhole tools. In the present invention, however, the separation of the retained part of the piston from the outer wall of the piston has the additional benefit that the liner plays no part in retaining the piston. The liner is therefore required only to support the piston throughout its range of movement and to provide the required seal with the piston. There is no requirement to have holes through the liner to retain the piston, nor to retain the liner. In addition, the liner preferably has plain outer and inner surfaces which allows simplified manufacturing (and machining) of the liner. The liner can also have a relatively thick wall section allowing it to be press-fitted in a bore of the tool. Press-fitting the liner has the consequential benefit that it can be retained by its interference fit in the tool and does not require separate retaining elements. The liner can also provide significant mechanical support to the piston, especially against the lateral forces which seek to tip the piston as it is rotated around (and to a lesser extent moved along) the borehole wall during drilling.

Notwithstanding the above benefits of a press-fitted liner, the inventors do not exclude the use of retaining elements for the liner, especially if it is desired to make the assembly and/or disassembly of the tool (i.e. the fitment and/or removal of the liner) easier.

Preferably the retainer has multiple retaining parts, ideally four retaining parts, and the piston has a corresponding number of cooperating retained parts. Desirably the retaining parts are substantially equally spaced around a circle centred in the cylinder. Desirably also the retaining parts are separated by openings, the openings being large enough to allow the retained parts of the piston to pass therethrough. In this way the piston can be mounted in the cylinder by passing the retained parts through the openings and then rotating the piston so that the retained parts are moved out of alignment with the openings and into alignment with the retaining parts. It will be understood that even partial alignment of the retained parts and retaining parts can retain the piston in the cylinder, but complete alignment or overlap is preferred.

The piston and retainer preferably have cooperating elements which lock the piston in the rotational position with the retained parts aligned with the retaining parts. Accordingly, in one method of assembly the retainer is firstly securely located in the cylinder. Secondly, the piston is inserted into the cylinder with its retained parts aligned with the openings between the retaining parts and the retained parts are moved through the openings. Thirdly, the piston is rotated relative to the retainer to align the retained parts with the retaining parts. Fourthly, the piston is locked against rotation relative to the retainer.

Preferably the piston is locked against rotation by at least one locking element or key. Desirably there is a plurality of locking elements spaced around the piston, for example four locking elements spaced substantially 90° apart. Preferably each locking element is a close sliding fit in a slot of a boss of the piston. The boss is ideally centrally located so that the locking elements can all be the same length. The four slots and the four elements can therefore form a "cross" shape in the boss. The slots are preferably machined into respective projecting formations of the boss, such slots allowing simple assembly and locking to the retainer. Preferably, the top surface of each projecting formation provides a retained part of the piston.

Preferably the locking element is a unitary or single-piece structure. Notwithstanding the benefits of a single-piece locking element, multi-component locking elements (including locking balls for example) can be used to prevent rotation of the piston relative to the retainer whilst allowing axial translation of the piston between its retracted and extended positions.

Desirably, the piston and cylinder assembly includes a locking post which can engage the locking element(s). The locking post is preferably located in a bore of the piston, ideally a central bore. The locking post preferably has a locking part and an unlocking part. The locking post can preferably move between a locking position and an unlocking position relative to the piston. In the locking position the locking part is aligned with the locking element(s) and the locking element(s) are forced outwardly into engagement with a part of the retainer whereby to prevent rotation of the piston relative to the retainer. In the unlocking position the unlocking part is aligned with the locking element(s) and the locking element(s) are released from the part of the retainer and the piston can rotate relative to the retainer to enable simple assembly and disassembly of the piston into the retainer.

Preferably, the locking part is a larger-dimension (preferably larger-diameter) portion of the locking post and the unlocking part is a smaller-dimension (preferably smaller-diameter) portion of the locking post. The locking part and the unlocking part of the locking post are preferably provided at different longitudinal positions of the locking post. Accordingly, the locking post can be moved longitudinally relative to the piston between its locking and unlocking positions.

The bore in the piston preferably continues to an opening in the top of the piston so that the locking post can be accessed from the outside of the (assembled) piston and cylinder. This enables the locking post to be moved from its locking position to its unlocking position as an initial stage in disassembly of the piston and cylinder. Preferably the opening is smaller than the cross-sectional dimension of the locking post so that the locking post can be accessed through the opening but it cannot be removed through the opening (and it cannot fall out of the tool downhole).

Desirably, the locking post can only be moved to its unlocking position when the piston is extended. Alternatively stated, the locking post is held in its locking position when the piston is retracted into the cylinder. This feature has the additional benefit during assembly in that the piston can be assembled with its locking post in its unlocking position; pushing the piston into the cylinder to its retracted position causes the locking post to move to its locking position. It is also preferably arranged that drilling fluid can enter the space below the locking post as the piston is extended in use; the force which this pressure creates holds the locking post in its locked position when the piston is extended.

The locking post is preferably an interference fit in the bore of the piston so that the action of downhole shock and vibration will not cause the post to move to the unlocking position. The locking post is preferably fitted with an O-ring which firstly helps to reduce the leakage of drilling fluid through the piston bore and secondly helps to reduce the likelihood that the locking post will slide out of the bore during assembly. The O-ring may alternatively be fitted in a groove within the piston, providing a similar sealing and retention function.

The retainer preferably has a longitudinal groove for the or each locking key (where "longitudinal" refers to the longitudinal axis of the piston and cylinder assembly, i.e. the axis along which the piston moves relative to the cylinder between its retracted and extended positions). It will be understood that the retainer does not move as the piston is extended and retracted and that the locking element(s) move with the piston. The longitudinal grooves allow the locking element(s) to slide up and down the retainer as the piston is extended and retracted, whilst preventing rotation of the piston in the cylinder.

The retainer is preferably removable from the remainder of the cylinder. The retainer can be securely mounted by a (removable) resilient retaining ring. A suitable retaining ring is available from the Smalley Steel Ring Company (see www.smalley.com/retaining-rings/spirolox). The retaining ring preferably fits into an annular groove adjacent the bottom of the cylinder and desirably secures the retainer by way of a peripheral lip at the bottom of the retainer. The retainer is preferably locked against rotation by an anti-rotation element fitted into a recess formed adjacent to the bottom of the cylinder and a recess of the retainer. Other methods of securing the retainer may be utilised, either instead of or as well as the retaining ring, including a press (or interference) fit interface or localised precision welding such as laser or electron beam welding when a more permanent retention mechanism is deemed advantageous.

There is also provided a downhole tool with at least one piston and cylinder assembly as defined herein. Some rotating tools and some non-rotating tools may utilise a single piston and cylinder assembly according to the invention, or perhaps a plurality of piston and cylinder assemblies in a single bank of piston and cylinder assemblies (the piston and cylinder assemblies in a bank being aligned along the longitudinal axis of the downhole tool and acting together to push the tool in one direction). Alternatively, and more typically, multiple piston and cylinder assemblies (or banks of piston and cylinder assemblies) are provided at circumferentially-spaced positions around the tool in any chosen array to suit the application. In the simplest form of rotary steerable tool for example there may be a single piston and cylinder assembly (or a single aligned bank of piston and cylinder assemblies which are actuated together) which provides a lateral force to the drill bit once each revolution. Typically, however, a rotary steerable tool will have multiple piston and cylinder assemblies (or multiple aligned banks of piston and cylinder assemblies), for example three piston and cylinder assemblies (or three banks of piston and cylinder assemblies) located approximately 120° apart around the circumference of the tool. Accordingly, there may be one or more piston and cylinder assemblies at each circumferential position and one or more bank(s) of piston and cylinder assemblies at different circumferential positions.

There is also provided a method of assembly of a downhole tool incorporating a piston and cylinder assembly, the method including the following steps:
1. securing a retainer in a cylinder formed in an outer wall of the tool, the retainer having at least one retaining part;
2. providing a piston with an outer wall and a retained part which is separate from the outer wall;
3. inserting the piston into the cylinder so that the retained part passes the retaining part;
4. rotating the piston relative to the retainer so that at least a portion of the retained part becomes aligned with at least a portion of the retaining part;
5. locking the piston against rotation relative to the retainer.

Preferred embodiments of the method can include one or more of the additional steps: {i} inserting a liner or sleeve (e.g. of ceramic such as tungsten carbide) into a bore of the tool to define the cylinder, {ii} fitting an anti-rotation element to prevent rotation of the retainer, and {iii} securing the retainer in the bore (for example by way of a retaining ring).

Other preferred embodiments of the method can include one or more of the additional steps: {i} fitting a locking post into a bore of the piston, {ii} fitting at least one locking element into a hole in the piston, {iii} positioning the locking post in an unlocking position before inserting the piston into the cylinder, and {iv} pressing the piston into its retracted position to move the locking post to a locking position.

BRIEF DESCRIPTION OF THE PREFERRED EMBODIMENTS

The invention will now be described in more detail, by way of example, with reference to the accompanying schematic drawings, in which.

DETAILED DESCRIPTION

FIGS. 1-6 show the general structure of a downhole tool 10 incorporating six piston and cylinder assemblies 12. As shown, in this embodiment the six piston and cylinder assembles 12 are arranged in three pairs (or banks), the piston and cylinder assemblies in each pair being aligned along the longitudinal axis L-L of the tool 10, and the three pairs being located at approx. 120° intervals around the longitudinal axis L-L.

Figure 1:
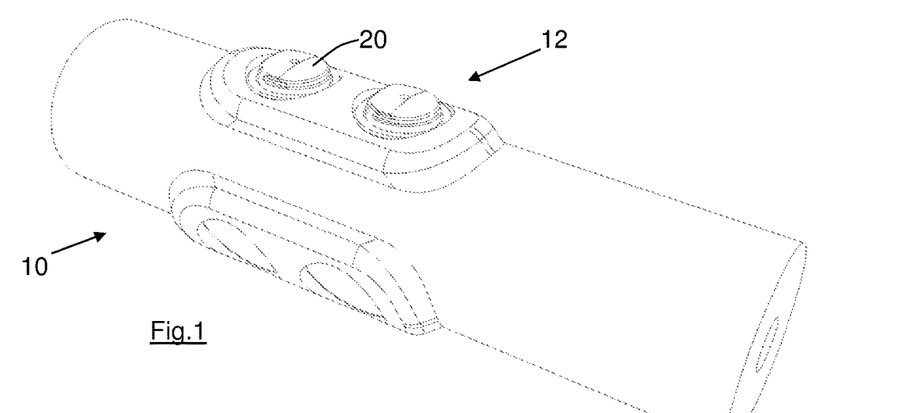
FIG. 1 shows a perspective view of a part of a downhole tool with multiple piston and cylinder assemblies according to the invention.
Figure 2:
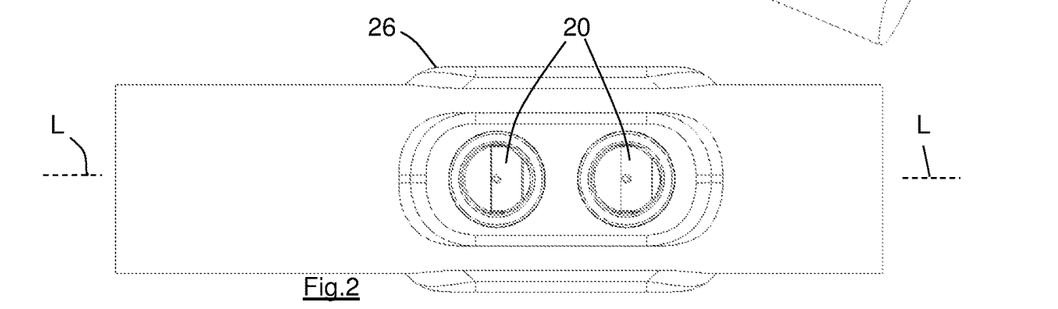
FIG. 2 shows a side view of the tool of FIG. 1.
Figure 3:
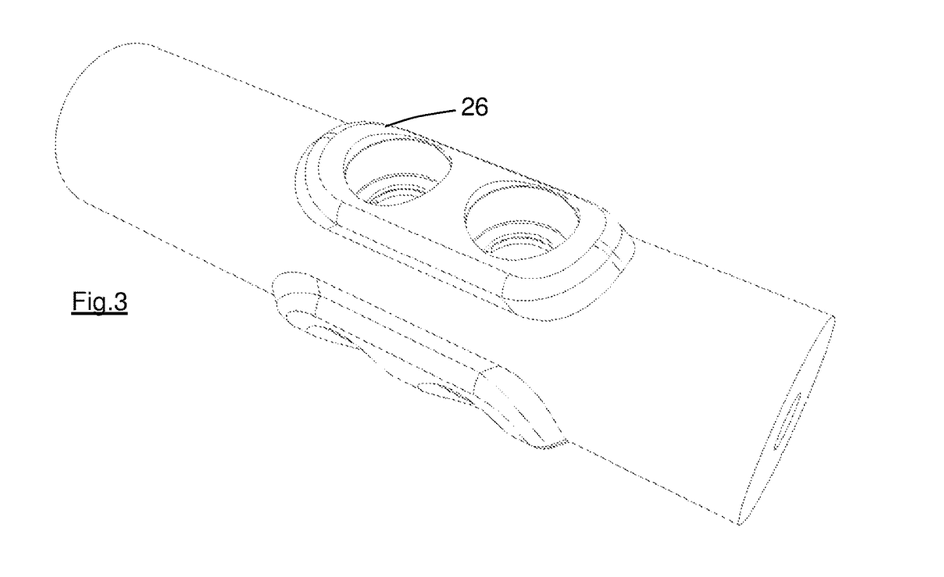
FIG. 3 shows a perspective view as FIG. 1 but with the pistons and cylinder liners removed.

The downhole tool 10 in this embodiment is a rotary steerable tool and it will be understood that one end of the tool shown in the drawings is connected to a drill bit (not shown) and the other end is connected to a drill string (not shown) which is in turn connected to the surface. The connections to the drill bit and to the drill string may be direct, or there may be intermediate componentry such as stabilisers, LWD tools and the like connected to one or both ends of the tool 10. In another embodiment the downhole tool 10 may also carry the drilling bit.

In known fashion, the tool 10 has a central bore 14 through which drilling fluid is pumped from the surface to the drill bit. Also in known fashion, the tool 10 contains ports and conduits to divert a proportion of the drilling fluid to the cylinders 16 to actuate the pistons 20 (the ports and conduits are not shown in these schematic drawings).

A controller (not seen) is also provided to control the flow of drilling fluid through the ports and conduits, and thereby to control the actuation of the pistons 20. In known fashion, to steer the drill bit in a chosen direction, each pair of pistons is actuated sequentially and cyclically in time with the rotation of the tool so that the tool (and consequently the drill bit) is pushed away from the centre of the borehole whereby to cause the drill bit to deviate from a linear path.

Figure 7:
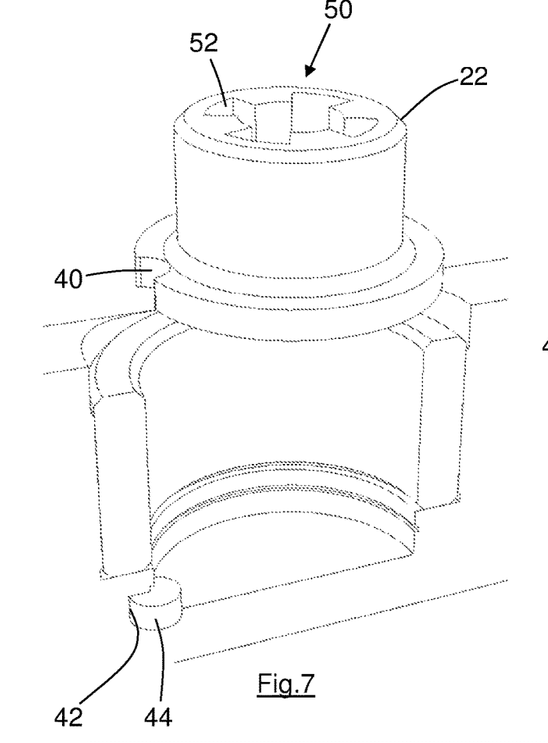
FIG. 7 shows a retainer and cylinder of the piston and cylinder assembly.
Figure 8:
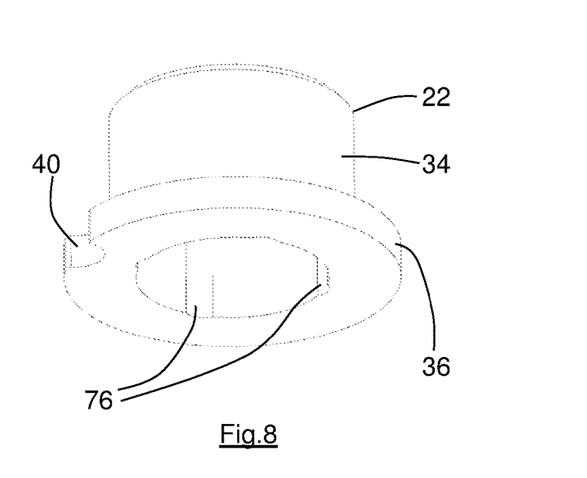
FIG. 8 shows an underside view of the retainer.
Figure 9:
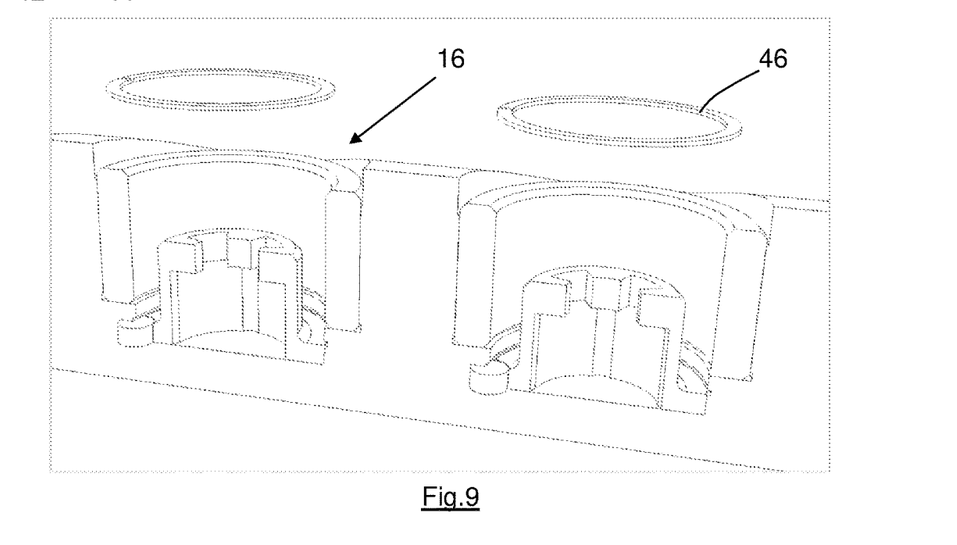
FIG. 9 shows a sectional view of two cylinders and the retaining rings for securing the retainers.

Each piston and cylinder assembly 12 includes a piston 20 and a retainer 22 (see FIGS. 7, 8). The retainer 22 retains the piston and allows disassembly of the piston from the cylinder when required, as explained below. Each cylinder 16 comprises a bore drilled into the tool as seen in particular in FIGS. 4 and 5 with a sleeve or liner 24 (in this embodiment of tungsten carbide) fitted into the bore. The liner 24 defines the cylinder wall, i.e. the surface along which the piston 20 moves during use. Whilst a separate liner is an optional feature in many cylinders, it is a beneficial feature of a downhole tool. Firstly, downhole tools operate in a very harsh environment and using a tungsten carbide liner greatly increases the reliability and service life of the tool. Secondly, a tungsten carbide liner enables a solid sliding seal to be provided with the piston 20, i.e. without a separate (elastomer) seal, thereby avoiding the reliability and long-term wear problems associated with elastomer seals. Thirdly, a tungsten carbide sleeve is significantly harder and better wearing than the material of the surrounding tool 10. Increased wear resistance helps to maintain design tolerances for longer, increasing the support for the piston 20 and the ability of the piston to withstand the considerable sideways forces which are exerted as the piston is dragged around and along the borehole wall in use.

Figure 6:
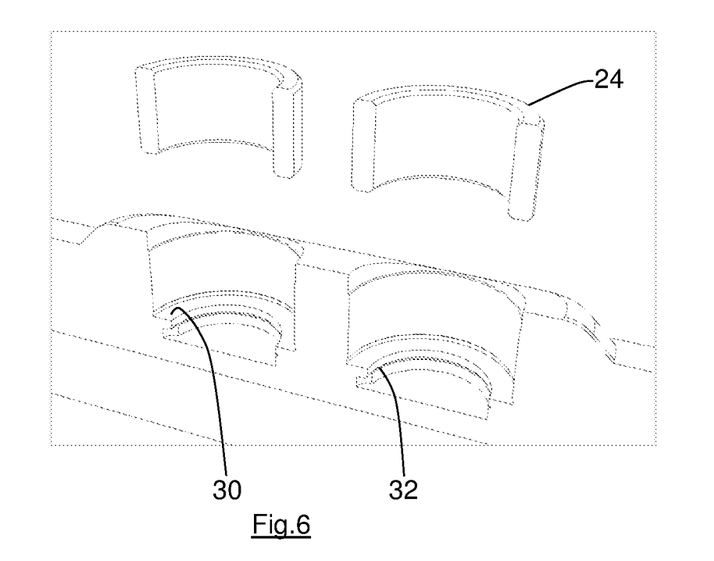
FIG. 6 shows a sectional view with the tungsten carbide sleeves used as liners for the cylinders.
Figure 13:
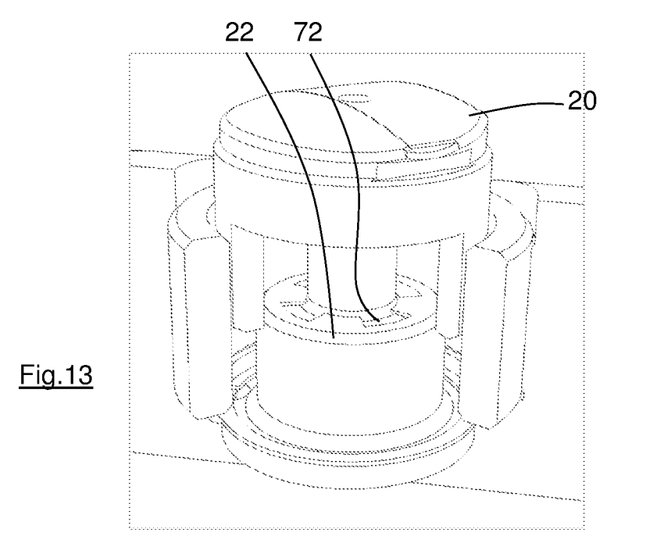
FIG. 13 shows the piston in the cylinder with a part of the piston cut away.

As most clearly shown in FIGS. 6 and 13, the sealing interface provided by the sliding contact surfaces of the sleeve 24 and piston 20 are complete and in this embodiment continuous. In particular, there are no holes or recesses in those surfaces to accommodate elements to retain the piston. There are therefore no corresponding holes or recesses in the material of the tool surrounding the liners 24. Accordingly, the size and shape of the buttress 26 which surrounds the outer parts of each pair of cylinders 16 are determined by the requirement to support the liners 24 (and in turn the pistons 20) and not by any requirement to retain the pistons. The size of the buttresses 26 can therefore be minimised commensurate with their supporting function, which in turn increases the junk slot area around the tool 10. Notwithstanding the use of a continuous sealing interface in this embodiment, the provision of surface deformations and/or features to enhance the seal is not excluded.

Additionally, the liners 24 can be made relatively thick and robust which enables them to be secured in the respective bores by press-fitting. No additional retaining componentry is therefore required for the liners 24. Also, no additional material is required for the buttresses 26 to accommodate that retaining componentry, further benefitting the junk slot area.

Figure 4:
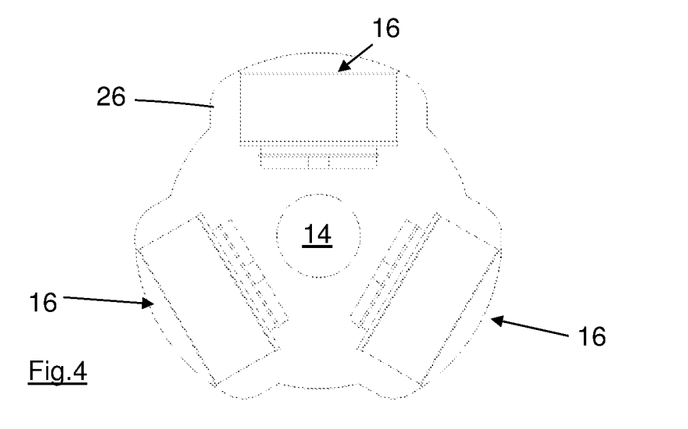
FIG. 4 shows an end view of the part of the downhole tool of FIG. 1, with the cylinders represented.
Figure 5:
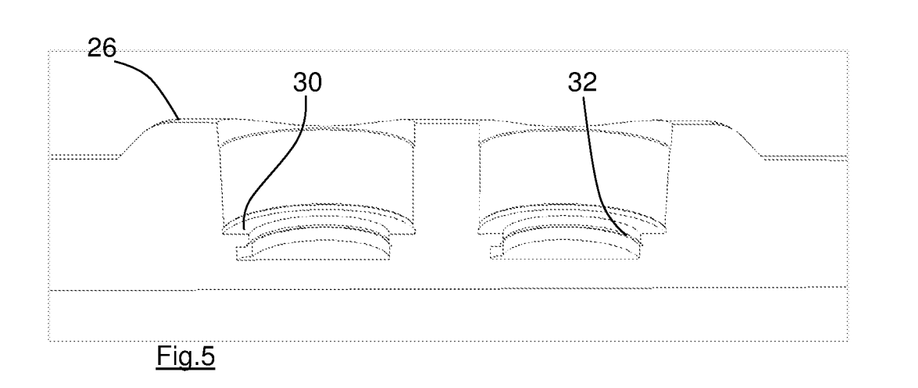
FIG. 5 shows a sectional view along the tool with the cylinder liners removed.

As better seen in FIGS. 4-6, the bores formed in the tool have an outer region of larger diameter to receive the liner 24. The outer region ends at a ledge 30 which provides a stop for the insertion of the liner 24. The ledge 30 also provides a step between the outer region of the bore and an inner region of smaller diameter. The inner region of the bore includes an undercut annular groove 32.

The retainer (or retaining hub) 22 is best seen in FIGS. 7 and 8. It is generally hollow and open at the bottom and has an overall structure somewhat similar to a top hat. It has a generally cylindrical side wall 34 and a peripheral lip 36 at its bottom end. The peripheral lip 36 is sized to fit closely into the inner, smaller-diameter, region of the cylinder bore. There is a recess 40 in the peripheral lip and a recess 42 in the inner region of the cylinder bore. The recesses 40 and 42 together accommodate an anti-rotation element 44. Other methods of anti-rotation are possible and will be readily identifiable by a skilled person, in particular comprising features/geometry such as a key and/or dog and/or pin for example.

The thickness (height) of the peripheral lip 36 is slightly smaller than the distance between the groove 32 and the bottom of the cylinder bore. Accordingly, when the retainer 22 is located in the cylinder bore it can be retained by a resilient retaining ring 46, with the outer part of the retaining ring 46 fitting into the groove 32 and the inner part of the retaining ring overlying the outer edge of the peripheral lip 36. In addition, the anti-rotation element 44 prevents rotation of the retainer so that the retaining ring 46 and anti-rotation element 44 together securely fix the retainer 22 in the cylinder bore. Nevertheless, the retaining ring 46 can be removed to permit removal of the retainer 22 for repair of the tool 10 and/or replacement of selected parts if required.

The top wall of the retainer 22 has a generally cross-shaped opening 50. The cross-shape of the opening comprises a central circular hole which extends into four radial openings 52. The top wall between each of the openings 52 (and in particular the underside of those parts) provides a respective retaining part as described below.

Figure 10:
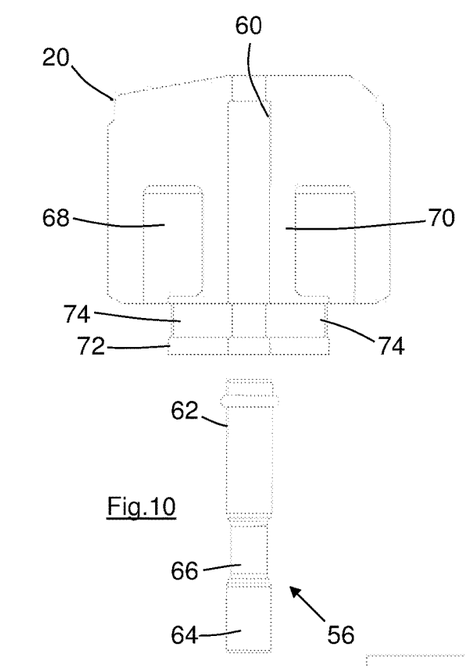
FIG. 10 shows a piston and the locking post for the piston.
Figure 11:
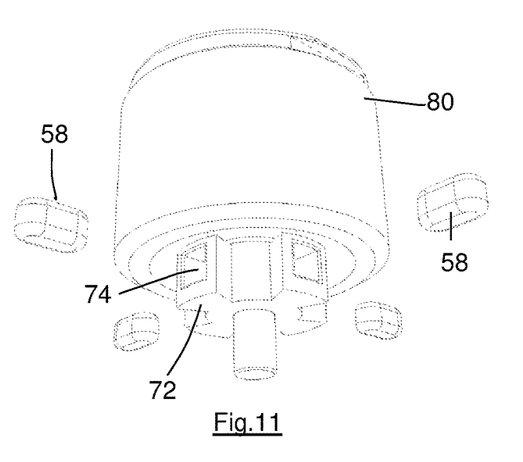
FIG. 11 shows the piston and the locking elements of the piston and their slots in the piston.

The piston 20 carries a locking post 56 and has four locking elements 58 as shown in FIGS. 10 and 11. The piston 20 has a central bore 60 which can accommodate the locking post 56. The locking post 56 is an interference fit in the bore 60 so that it is sufficiently retained in the downhole environment not to move to its unlocking position under severe shock and vibration in use. The locking post 56 also has an O-ring 62 which helps to retain the locking post in the bore during handling and assembly but is primarily provided to reduce or prevent the leakage of drilling fluid through the bore 60 in use.

The locking post 56 has a locking part 64 and an unlocking part 66, the unlocking part being a reduced-diameter portion of the locking post.

The bottom of the piston 20 is partially-hollowed out to provide a void 68 surrounding a boss 70. The bottom end of the boss 70 has four projecting formations 72 which form a general cross-shape when viewed from below (see FIG. 18). The boss 70 and the projecting formations 72 together are similarly sized and shaped to the cross-shaped opening 50 in the retainer 22. In particular, the projecting formations 72 are sized and shaped to pass through the respective radial openings 52 of the retainer 22. Each of the projecting formations 72 (and in particular the top of each projecting formation) provides a retained part of the piston, as described below.

A hole or slot 74 is formed through each of the projecting formations 72 and accommodates a respective locking element or key 58.

The assembly is commenced by inserting the locking post 56 into the bottom end of the piston bore 60 as represented in FIG. 10. The four locking elements 58 are then inserted into their respective slots 74. The slots 74 are open at their inner end so that the inner end of each of the locking elements 58 engages the locking post 56. The locking post 56 is positioned in its unlocking position in which the unlocking part 66 is aligned with the slots 74 and the locking elements 58 are placed/inserted fully into their respective slot 74.

Figure 12:
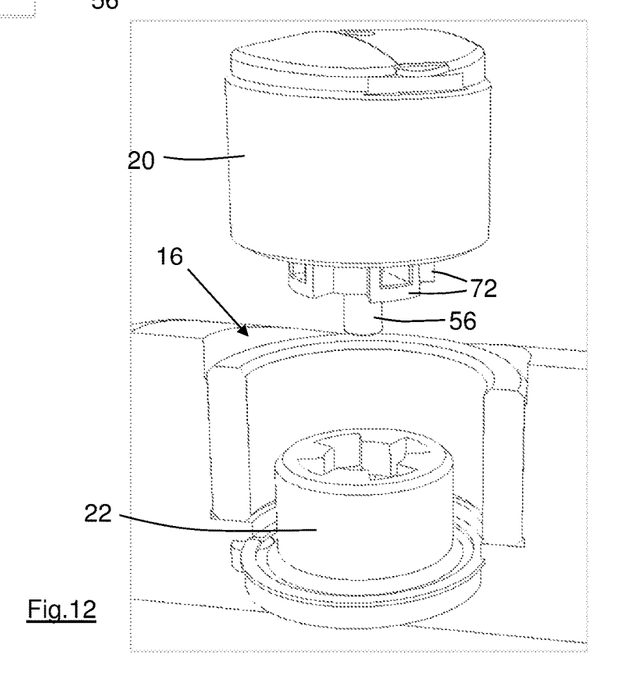
FIG. 12 shows the piston and locking post immediately prior to insertion into the cylinder.

With the locking elements 58 placed/inserted fully into their respective slot 74 the piston 20 with the locking post 56 and locking keys 58 can be inserted into the cylinder 16 as represented in FIG. 12 (although the locking keys 58 are not shown in that figure). As represented in the cut-away drawing of FIG. 13, the piston 20 is aligned with the retainer 22 so that the projecting formations 72 and the locking elements 58 can pass through the cross-shaped opening 50 in the top wall of the retainer 22.

When the piston 20 has been inserted sufficiently for the projecting formations 72 to lie below the top wall of the retainer 22 (and which position approximates to the extended position of the piston in use), the piston 20 is rotated through approximately 45° relative to the cylinder 16 and its retainer 22. This rotation moves the projecting formations 72 out of alignment with the openings 52 and into alignment with the retaining parts between those openings.

As seen in FIG. 8, four longitudinal grooves 76 are formed into the inside surface of the cylindrical wall 34 of the retainer 22. It is arranged that when the projecting formations 72 are in alignment with the retaining parts between the openings 52 of the retainer 22, the locking elements 58 are each aligned with a respective groove 76. The locking elements 58 may therefore move outwards slightly so that they project by a small distance from their respective slot 74 and project into a respective groove 76.

Figure 14:
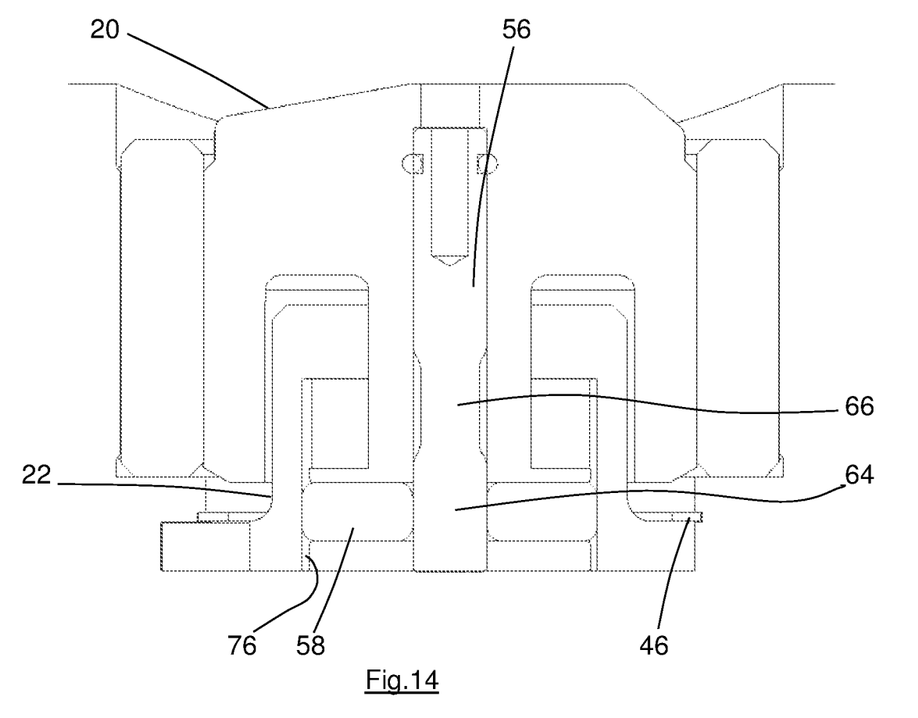
FIG. 14 shows the piston in its retracted position in the cylinder with the locking post in its locking position.

It will be seen from FIG. 12 in particular that during assembly with the unlocking part 66 aligned with the locking elements 58, the locking post 56 projects from the bottom of the piston bore 60 by a significant distance. It is arranged that the bottom end of the locking post 56 can engage the bottom of the cylinder 16, whereby further downwards movement of the piston 20 (towards or into its retracted position) causes the piston 20 to move downwardly relative to the locking post 56. This relative movement causes the unlocking portion 66 of the locking post to move out of alignment with the locking elements 58 and for the locking portion 64 to move into alignment with the locking elements. As seen in FIG. 14, as the locking post 56 moves upwards relative to the piston 20 the locking elements 58 are forced to move outwardly into a respective groove 76.

Figure 15:
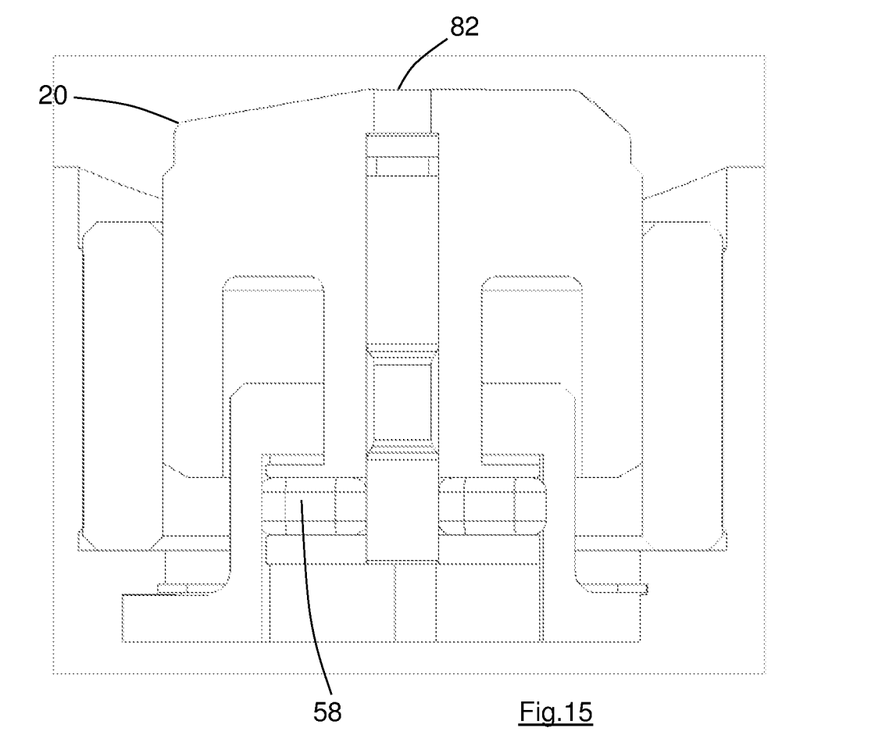
FIG. 15 shows the piston in its extended position in the cylinder with the locking post in its locking position.
Figure 16:
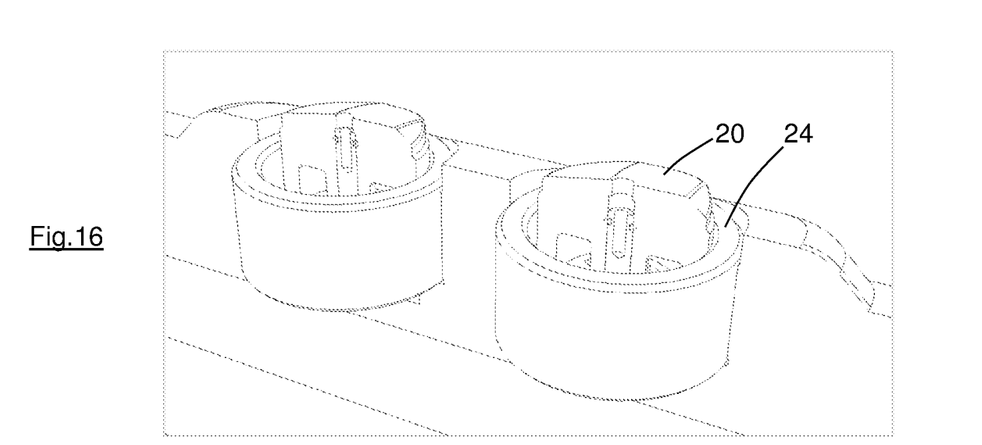
FIG. 16 shows a perspective cut-away view of part of the tool with two pistons.
Figure 17:
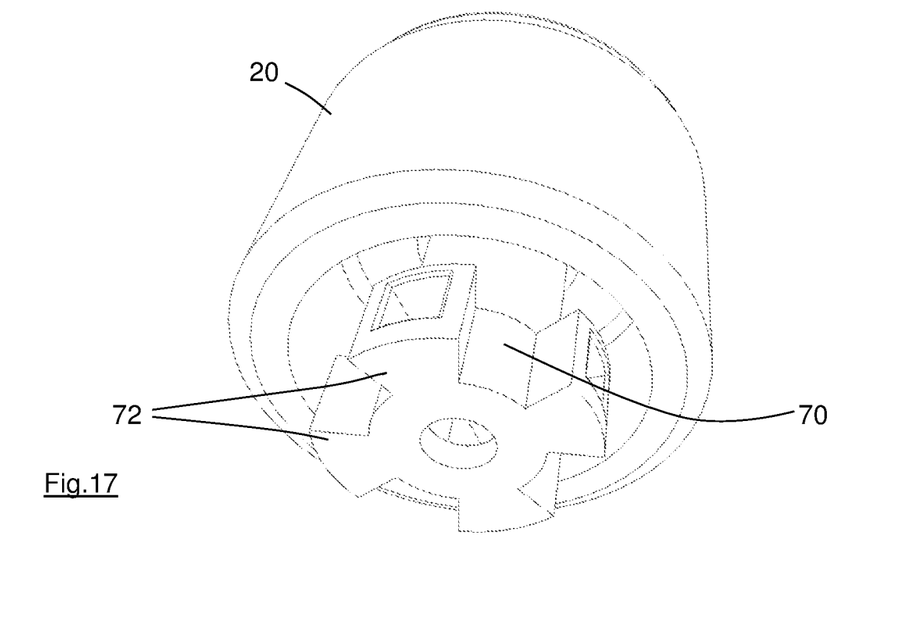
FIG. 17 shows a perspective view of a piston from underneath, without the locking elements.

The fully assembled piston and cylinder assembly 12 is shown in FIGS. 14 and 15, i.e. with the locking post 56 in its locking position and each locking element 58 projecting into a respective groove 76. The piston 20 can slide relative to the cylinder 16 between its retracted and extended positions (FIGS. 14 and 15 respectively) with the locking elements 58 sliding along the respective grooves 76. It will be understood that the piston 20 is retained in the cylinder 16 by the retaining parts of the retainer (in particular the underside of the top wall of the retainer 22 between the openings 52) which overlie the retained parts of the piston (in particular the tops of the projecting formations 72). It will also be understood that the piston 20 cannot be rotated to align the projecting formations 72 with the openings 52 because the outer ends of each of the locking elements 58 project into the respective groove 76. The locking elements 58 are held in the position in which they project into the grooves 76 by the locking post 56, in particular by the locking part 64 of the locking post which engages the inner ends of the locking elements 58 and prevents the inwards movement of the locking elements.

The locking post 56 is in turn held in its locking position partially by its interference fit in the piston bore 60. However, it will be understood that in use drilling fluid (at close to the pressure in the central bore 14), engages the bottom end of the piston 20 and also the bottom end of the locking post 56 and the locking post is thereby maintained in the locking position when it is extended. When the piston is in its retracted position the locking post 56 is held in its locking position by the engagement of its bottom end on the bottom of the cylinder 16.

It will be understood that the means by which the piston 20 is retained in the cylinder 16 is separate from the piston wall 80, and therefore separate from the sealing interface between the piston 20 and cylinder 16. The sealing interface can be maximised without any compromise necessitated by a retaining function.

It will also be understood that the piston and cylinder assembly may be disassembled for repair and/or maintenance, substantially by reversing the above assembly steps. Firstly, the piston 20 is levered or otherwise lifted into its extended position (see FIG. 18) and locked in the extended position with appropriate tooling. Secondly, a suitable tool is inserted into the hole 82 (FIG. 15) in the top of the piston 20 to engage the top end of the locking post 56. The locking post 56 is pushed downwardly relative to the piston 20 from the position shown in FIG. 18.

Figure 18:
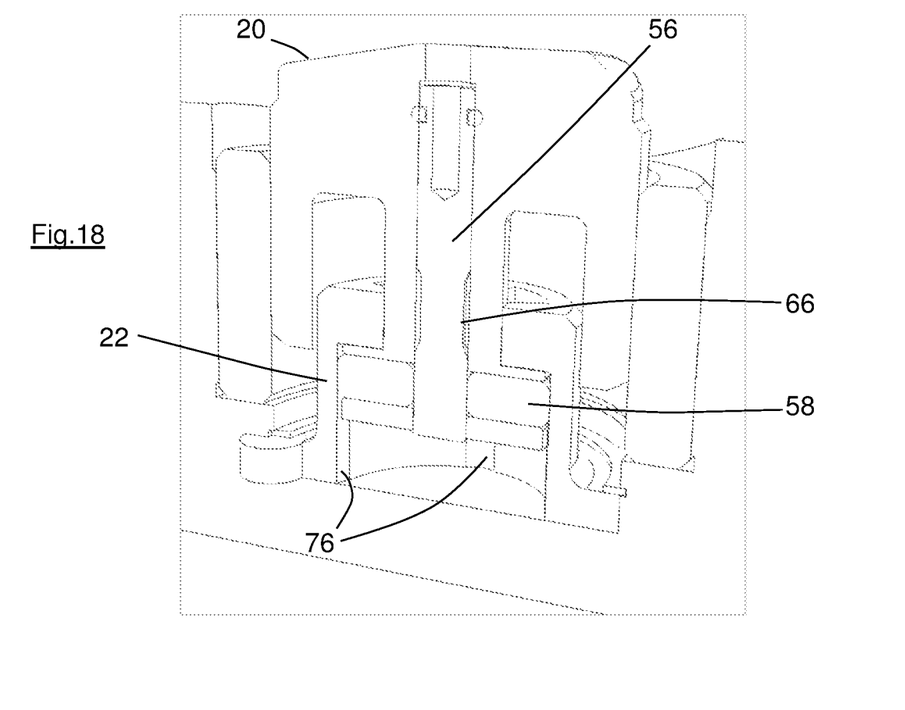
FIG. 18 shows a cut-away view during an initial stage of disassembly of the piston and cylinder assembly.

The downwards relative movement of the locking post 56 causes the unlocking part 66 of the locking post to be moved into alignment with the locking elements 58. The locking elements 58 are then free to move out of the grooves 76 and can be eased out the grooves by small and repeated rotational movements of the piston 20. It will be understood that the rounded shape of the grooves 76 and the rounded ends of the locking elements 58 assist the release of the locking elements once the locking post 56 is in its unlocking position.

With the locking elements 58 released from the grooves 76 the piston 20 can be rotated relative to the retainer 22 until the projecting formations 72 are aligned with the openings 52 in the top wall of the retainer. The piston 20 and its locking post 56 and locking elements 74 can then be lifted from the cylinder 16.

The retainer 22 can also be removed if required by firstly removing the resilient retaining ring 46.

What is claimed is:

1. A piston and cylinder assembly of a downhole tool, comprising:
   a piston and a cylinder,
   the piston having an outer wall which is in direct sliding contact with a wall of the cylinder, the piston being slidable along a cylinder axis, the cylinder having a retainer for the piston, the retainer having at least one retaining part, the piston having at least one retained part, the at least one retaining part and the at least one retained part cooperating to retain the piston in the cylinder, the at least one retained part being separate from the outer wall, in which the at least one retaining part and the at least one retained part are moved into and out of alignment by rotation of the piston around the cylinder axis relative to the cylinder.

2. The piston and cylinder assembly according to claim 1 in which the piston is movable in the cylinder between a retracted position and an extended position, and in which the at least one retained part engages the retaining part in the extended position.

3. The piston and cylinder assembly according to claim 1 in which the retainer is located substantially centrally in the cylinder.

4. The piston and cylinder assembly according to claim 1 in which the retainer is removably mounted in the cylinder by a resilient retaining ring.

5. The piston and cylinder assembly according to claim 1 in which an anti-rotation element prevents rotation of the retainer in the cylinder.

6. The piston and cylinder assembly according to claim 1 in which the cylinder has a liner providing the wall of the cylinder.

7. The piston and cylinder assembly according to claim 6 in which liner is retained in a bore of the downhole tool by an interference fit.

8. The piston and cylinder assembly according to claim 1 in which the retainer has a plurality of retaining parts and the piston has a plurality of retained parts.

9. The piston and cylinder assembly according to claim 1 in which the retainer has four retaining parts and the piston has four retained parts.

10. The piston and cylinder assembly according to claim 8 in which the plurality of retaining parts are separated around the cylinder and the plurality of retained parts are separated around the piston.

11. The piston and cylinder assembly according to claim 10 in which the plurality of retaining parts are separated by openings which can accommodate the plurality of retained parts.

12. The piston and cylinder assembly according to claim 1 in which the piston has at least one locking element to secure the piston in a rotational position in which at least a portion of the at least one retained part is aligned with at least a portion of the at least one retaining part.

13. The piston and cylinder assembly according to claim 12 in which the retainer has a longitudinal groove for the at least one locking element.

14. The piston and cylinder assembly according to claim 13 in which the at least one locking element moves along the longitudinal groove as the piston moves between its retracted and extended positions.

15. The piston and cylinder assembly according to claim 12 in which there is a plurality of locking elements spaced apart around the piston and cylinder assembly.

16. The piston and cylinder assembly according to claim 12 in which the at least one locking element is slidably mounted to the piston.

17. The piston and cylinder assembly according to claim 16 in which a direction in which the at least one locking element slides relative to the piston is perpendicular to a longitudinal axis of the piston and cylinder assembly.

18. The piston and cylinder assembly according to claim 16 in which the piston has at least one projecting formation, the at least one projecting formation having a slot to accommodate the at least one locking element.

19. The piston and cylinder assembly according to claim 18 in which the at least one projecting formation provides at least a portion of the at least one retained part.

20. The piston and cylinder assembly according to claim 12 including a locking post which can engage the at least one locking element.

21. The piston and cylinder assembly according to claim 20 in which the locking post is mounted in a bore of the piston.

22. The piston and cylinder assembly according to claim 21 in which the bore of the piston continues to an opening in a top of the piston.

23. The piston and cylinder assembly according to claim 22 in which the opening in the top of the piston is smaller than a cross-sectional dimension of the locking post.

24. The piston and cylinder assembly according to claim 21 in which the locking post is an interference fit in the bore of the piston.

25. The piston and cylinder assembly according to claim 20 in which the locking post has a locking part and an unlocking part.

26. The piston and cylinder assembly according to claim 25 in which the locking part and the unlocking part are located at different longitudinal positions of the locking post, and in which the locking post can move longitudinally relative to the piston between a locking position and an unlocking position relative to the piston.

27. The piston and cylinder assembly according to claim 1 wherein said piston and cylinder assembly in configured to form a portion of said downhole tool.

28. The piston and cylinder assembly according to claim 27 wherein said downhole tool is configured as a rotary steerable tool.

29. The piston and cylinder assembly according to claim 27 having at least three piston and cylinder assemblies circumferentially spaced apart around the downhole tool.

30. A method of assembly of a piston and cylinder assembly of a downhole tool, the method comprising sequential steps of:
  {i} securing a retainer in a cylinder of the downhole tool, the retainer having at least one retaining part;
  {ii} providing a piston with an outer wall and a retained part which is separate from the outer wall;
  {iii} inserting the piston into the cylinder so that the retained part passes the at least one retaining part;
  {iv} rotating the piston relative to the cylinder so that at least a portion of the retained part becomes aligned with at least a portion of the at least one retaining part;
  {v} locking the piston against rotation relative to the cylinder.

31. The method according to claim 30 further comprising:
  {i} inserting a liner into a bore of the downhole tool to define a wall of the cylinder,
  {ii} fitting an anti-rotation element to prevent the retainer rotating in the cylinder,
  {iii} fitting a retaining ring to secure the retainer in the cylinder.

32. The method according to claim 30 further comprising:
  {i} providing a locking post having a locking part and an unlocking part,
  {ii} fitting the locking post into a bore of the piston,
  {iii} fitting at least one locking element into the piston,
  {iv} positioning the locking post with its unlocking part aligned with the at least one locking element before said inserting the piston into the cylinder so that the retained part passes the at least one retaining part,
  {v} undertaking said locking the piston against rotation relative to the cylinder by moving the locking post to align the locking part with the at least one locking element.

33. The method according to claim 32 in which in step {v} the locking post engages a bottom of the cylinder and is moved to align the locking part with the at least one locking element as the piston is inserted into the cylinder.

* * * * *